UNITED STATES PATENT OFFICE.

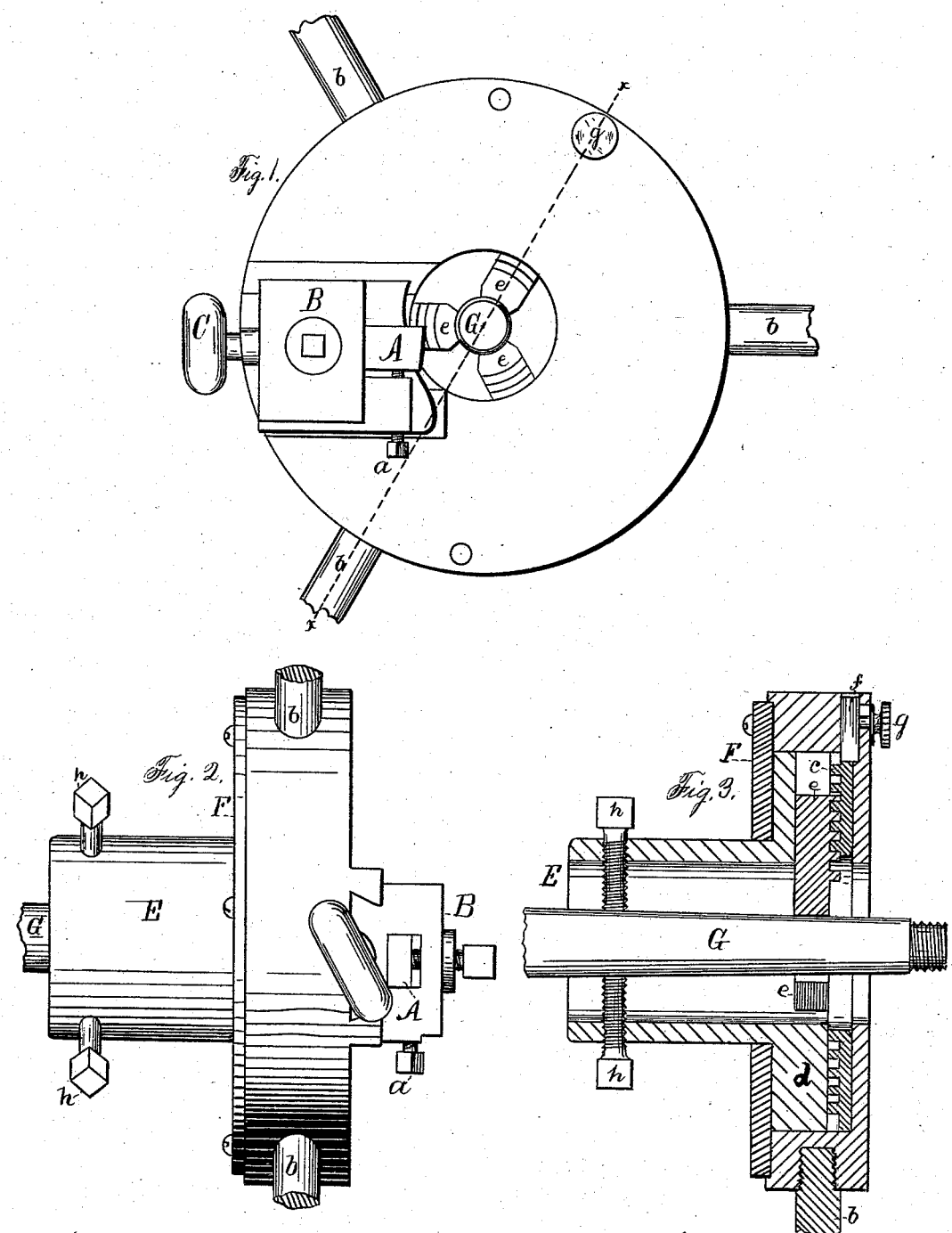

FREDERICK L. ELLIS AND JAMES M. ELLIS, OF MILLDALE, ASSIGNORS TO J. B. SAVAGE, OF SOUTHINGTON, CONNECTICUT.

WAGON-AXLE CUTTER.

SPECIFICATION forming part of Letters Patent No. 261,692, dated July 25, 1882.

Application filed September 8, 1881. (No model.)

*To all whom it may concern:*

Be it known that we, FREDERICK L. ELLIS and JAMES M. ELLIS, of Milldale, in the county of Hartford and State of Connecticut, have invented certain new and useful Improvements in Machines for Dressing Wagon-Axles, of which the following is a specification.

Our invention relates to improvements in machines for dressing the arms of wagon-axles, in which a revolving cutter-head is combined with universal centering-jaws; and the object of our improvement is to more readily and perfectly adjust the cutter-head concentrically upon the axle-arm preparatory to dressing said arm. We attain this object by the mechanism illustrated in the accompanying drawings, in which—

Figure 1 is a front elevation; Fig. 2, a side elevation, and Fig. 3 a sectional view on line $x\,x$ of Fig. 1.

The machine is intended for dressing the axle-arms of wagons which have become so worn that the axle-box does not fit properly, and they are to be dressed by turning off a little from the shoulders to let the box take a position a little farther up on the tapering axle-arm, and thereby insure a snug fit. Prior machines of a different construction have been made for doing the same work.

A designates the cutter, mounted in a tool-post, B, and made adjustable radially by means of the T-shaped screw C and adjustable transversely to a radial line by means of screw $a$. These parts are mounted upon a rotating head, D, provided with operating-handles $b$, whereby we term said head a "rotary" or "revolving" cutter-head. This head D is provided with a concentric recess or chamber, within which is placed, first, a scroll-disk, $c$; second, a thicker circular plate, $d$, having a rearwardly-extending hub, E, and the front of which plate $d$ is provided with radial slots; and, third, universal jaws $e$, fitted within the radial slots in the plate $d$, and having teeth on their front faces which engage the thread of the scroll-disk $c$ after the manner of an ordinary universal chuck.

An annular plate, F, is secured by screws to the head D, to hold the parts together in such manner that the head D may revolve upon the plate $d$.

In order to make the jaws work out and in, after the manner of an ordinary universal chuck, it is necessary to make the scroll-disk revolve with the head while the jaws and plate $d$ are stationary, or vice versa. We therefore make one or more notches in the edge of disk $c$, and provide a little slide, $f$, having a handle, $g$, which slide can be forced into one of the notches and lock the disk to the head D, so as to insure its movement therewith. The friction of the disk within the head may be sufficient for this purpose; but in order to revolve the head without moving the jaws out or in, it is necessary that the disk shall be detachable from the head, because if the jaws do not move while the head is in motion the head must rotate without moving the disk. The jaws are so formed that when they are fitted in position and engage the thread of the scroll-disk their inner ends are a uniform distance from the axis of the head at all times, as in ordinary universal chucks, whereby said jaws are what may be termed "universal jaws." The rear end of the hub is provided with set-screws $h$.

In the drawings the machine is represented in proper position upon the axle-arm for dressing the shoulder at the outer end.

In order to use the machine, it is first placed upon the axle-arm G and the disk $c$ locked to the head by means of the slide $f$. The hub E and plate $d$ are held stationary while the head D is revolved, or vice versa, until the jaws $e$ all bear upon the axle-arm and center the head. If the head is not in the desired position longitudinally with the axle-arm, it can be moved into that position and the jaws again brought to bear upon said arm, as before. The set-screws $h$ are then turned up to center that end of the machine and to assist in holding it in place longitudinally upon the axle. The slide $f$ is then disengaged from the disk, and the head may be rotated independently of the disk, set-screws, and jaws. The chisel may be adjusted to gradually cut the axle-arm, as desired, while the chisel and head are revolved around it. To cut the inner shoulder it is only necessary to put the machine upon the axle-arm with the end which carries the cutter facing said inner shoulder—that is, facing the opposite direction from that in which it is represented in the drawing.

We claim as our invention—

The combination of the revolving cutter-head, having the tool-post mounted thereon and made adjustable radially, and the universal jaws for adjusting the cutter-head concentrically upon the axle-arm, substantially as described, and for the purpose specified.

FREDERICK L. ELLIS.
JAMES M. ELLIS.

Witnesses:
EDWIN G. LEWIS,
CHARLES HITCHCOCK.